United States Patent [19]

Depew

[11] Patent Number: 5,006,018
[45] Date of Patent: Apr. 9, 1991

[54] FEED AND SEPARATION DEVICE

[75] Inventor: Llewellyn E. Depew, Ontario, Canada

[73] Assignee: Filter Queen Ltd., Rexdale, Canada

[21] Appl. No.: 327,832

[22] Filed: Mar. 23, 1989

Related U.S. Application Data

[63] Continuation of Ser. No. 63,624, Jun. 19, 1987, Pat. No. 4,834,586.

[30] Foreign Application Priority Data

Jun. 19, 1986 [CA] Canada ................................. 511905

[51] Int. Cl.⁵ ............................................. B65G 53/66
[52] U.S. Cl. ....................................... 406/18; 406/23; 406/32; 406/152; 406/169; 406/173
[58] Field of Search ...................... 406/18, 19, 22, 23, 406/26, 27, 32, 151, 152, 139, 106, 168, 169, 173

[56] References Cited

U.S. PATENT DOCUMENTS

| | | |
|---|---|---|
| 1,897,195 | 2/1933 | Howden . |
| 2,035,410 | 3/1936 | Smith ................................. 406/169 |
| 2,134,978 | 11/1938 | Marshall . |
| 2,252,581 | 8/1941 | Saint-Jacques ...................... 406/173 |
| 2,580,581 | 1/1952 | Niemitz .............................. 406/173 |
| 2,744,792 | 5/1956 | Finn . |
| 2,890,081 | 6/1959 | Terrett ................................ 406/169 |
| 3,030,153 | 4/1962 | Krenke et al. ....................... 406/173 |
| 3,273,943 | 9/1966 | Russell . |
| 3,561,824 | 2/1971 | Homan ............................... 406/173 |
| 3,925,044 | 12/1975 | Tu et al. . |
| 3,994,532 | 11/1976 | Hahn .................................. 406/152 |
| 4,200,415 | 4/1980 | Boring . |
| 4,415,297 | 11/1983 | Boring . |
| 4,473,326 | 9/1984 | Oetiker ............................... 406/173 |

Primary Examiner—Sherman D. Basinger
Assistant Examiner—Stephen P. Avila
Attorney, Agent, or Firm—Rogers & Scott

[57] ABSTRACT

Apparatus is provided for operation periodically to move particulate material from a first level to a higher second level using air entrained to move in a loop. The apparatus includes a pick-up coupled in the loop and positioned in the material at the first level so that the material is entrained in the air loop, and a separator above the second level which is also coupled in the air loop and which is operable to strip the material from the air. The separator has an exit above which the material is collected and an actuator is operable periodically to collect batches of the material in the separator at the exit. A closure is coupled to the exit and operable to release a batch at the second level after each period of operation of the actuator.

9 Claims, 5 Drawing Sheets

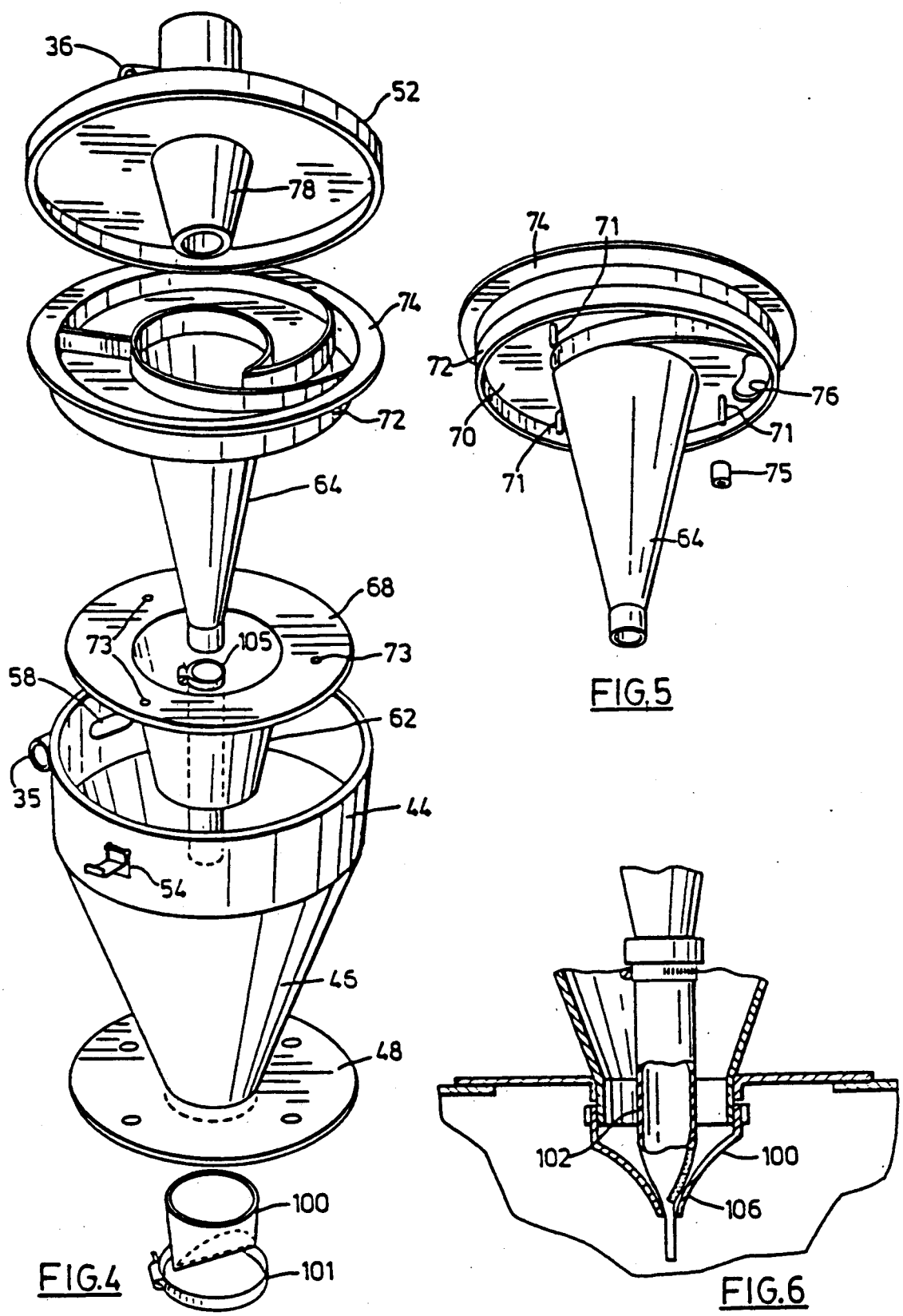

FEED AND SEPARATION DEVICE

This application is a continuing application of co-pending application Ser. No. 07/063,624 filed June 19, 1987 now Pat. No. 4834586 and this application discloses and claims only subject matter disclosed in said earlier copending application.

This invention relates to material elevating systems of the type used to move particulate material from a lower to an upper level where the material is required for storage or for use in a process. More particularly, the invention relates to apparatus for feeding machines such as injection moulding machines which receive particulate synthetic material at a level where the material can flow into the machine for subsequent melting and injection into the mould.

Although this invention will be described with particular reference to apparatus used to elevate particulate material used in injection moulding machines, it will be clear that the invention is applicable to elevating particulate, pulverulent and other materials generally, and the invention is not to be limited by the exemplary description. Further, the word "particulate" is used to include granular as well as mixtures having a significant powder or dust content.

Particulate and granular materials are often moved by the use of an apparatus having an air system which entrains the material and causes it to move with the air along a duct, pipe and the like. When such apparatus is used in association with injection moulding machines, the entrained material is separated from the air at a level above the injection moulding machine and the exhaust then passes through a filter into air within the building containing the machine. Clearly, the exhaust must be filtered aggressively in order to ensure that no fine particulates are sent into the building where they could become a health hazard. As a result the apparatus must include a replacable filter which requires periodic servicing to ensure that the pressure drop across the filter does not become excessive with resulting drop in efficiency and increase in energy requirements. The filters are usually placed high above the operator who has to use a ladder or other apparatus to position himself to service the filter and this is both time consuming and hazardous. As a result recycled scrap having a high dust content must be used sparingly otherwise the filters will be clogged repeatedly.

A further consideration when using apparatus of this type in injection moulding equipment is the fact that some materials are hygroscopic and must be kept dry. The material is sometimes received in sealed containers having acceptable moisture content but can also be delivered in open containers in which case the material must first be dried. When the dry material is moved, the ambient air used to transport the material shares its moisture content with the material. As a result, after elevation, the material must be again dried to remove moisture transferred from this air. A significant amount of energy must be used to dry the material if the ambient air has a high moisture content.

In view of the foregoing problems, among the objects of the present invention are to minimize energy losses caused by the need to remove moisture after elevation of the material, and to remove the need for mechanical filters. A further object is to produce apparatus having great reliability and which requires minimal servicing.

In accordance with one of the aspects of the invention, apparatus is provided for operation periodically to move particulate material from a first level to a higher second level using air entrained to move in a loop. The apparatus includes a pick-up coupled in the loop and positioned in the material at the first level so that the material is entrained in the air loop, and a separator above the second level which is also coupled in the air loop and which is operable to strip the material from the air. The separator has an exit above which the material is collected and an actuator is operable periodically to collect batches of the material in the separator at the exit. A closure is coupled to the exit and operable to release a batch at the second level after each period of operation of the actuator.

According to another aspect of the invention, a device is provided for removing material from air in batches.

These and other aspects of the invention will be better understood with reference to the drawings, in which:

FIG. 4 is an exploded perspective view of parts of the separator and illustrating how the separator is assembled;

FIG. 5 is a perspective view of a part of the separator shown in FIG. 4 and viewed from below;

FIG. 6 is a sectional side view of a closure forming part of the separator and drawn to a scale larger than that used for FIG. 4;

Figure 1:
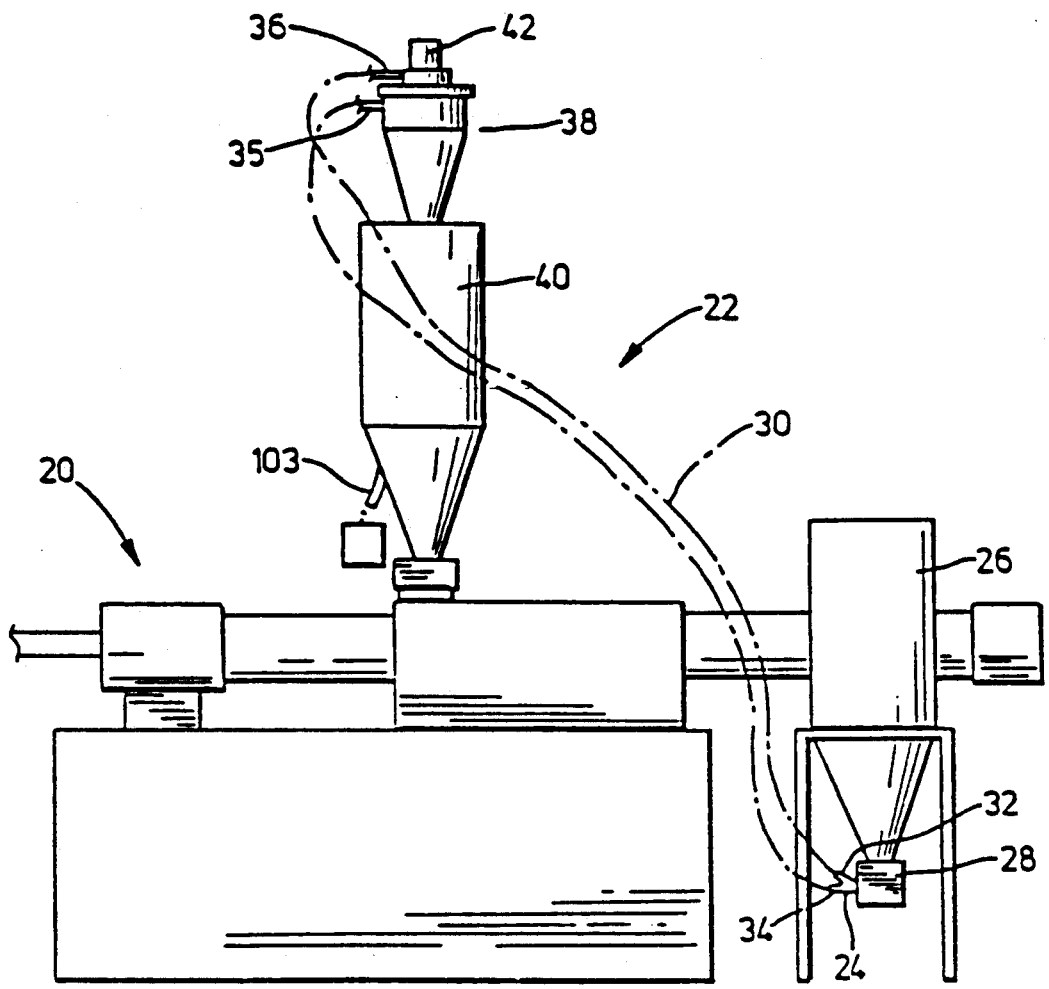
FIG. 1 is a side-view showing an injection moulding machine diagrammatically and apparatus according to a preferred embodiment of a type for use with the injection moulding machine.
Figure 2:
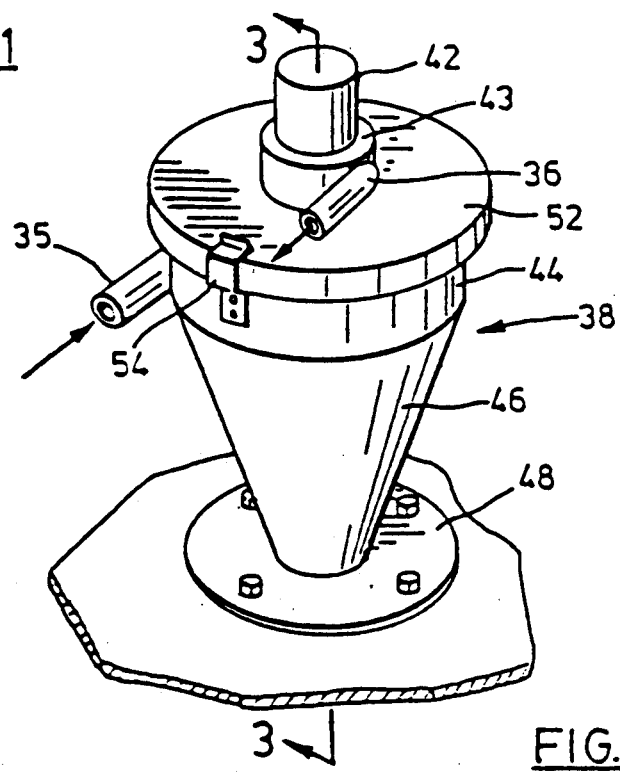
FIG. 2 is a perspective view of a portion of the apparatus and including a separator.
Figure 3:
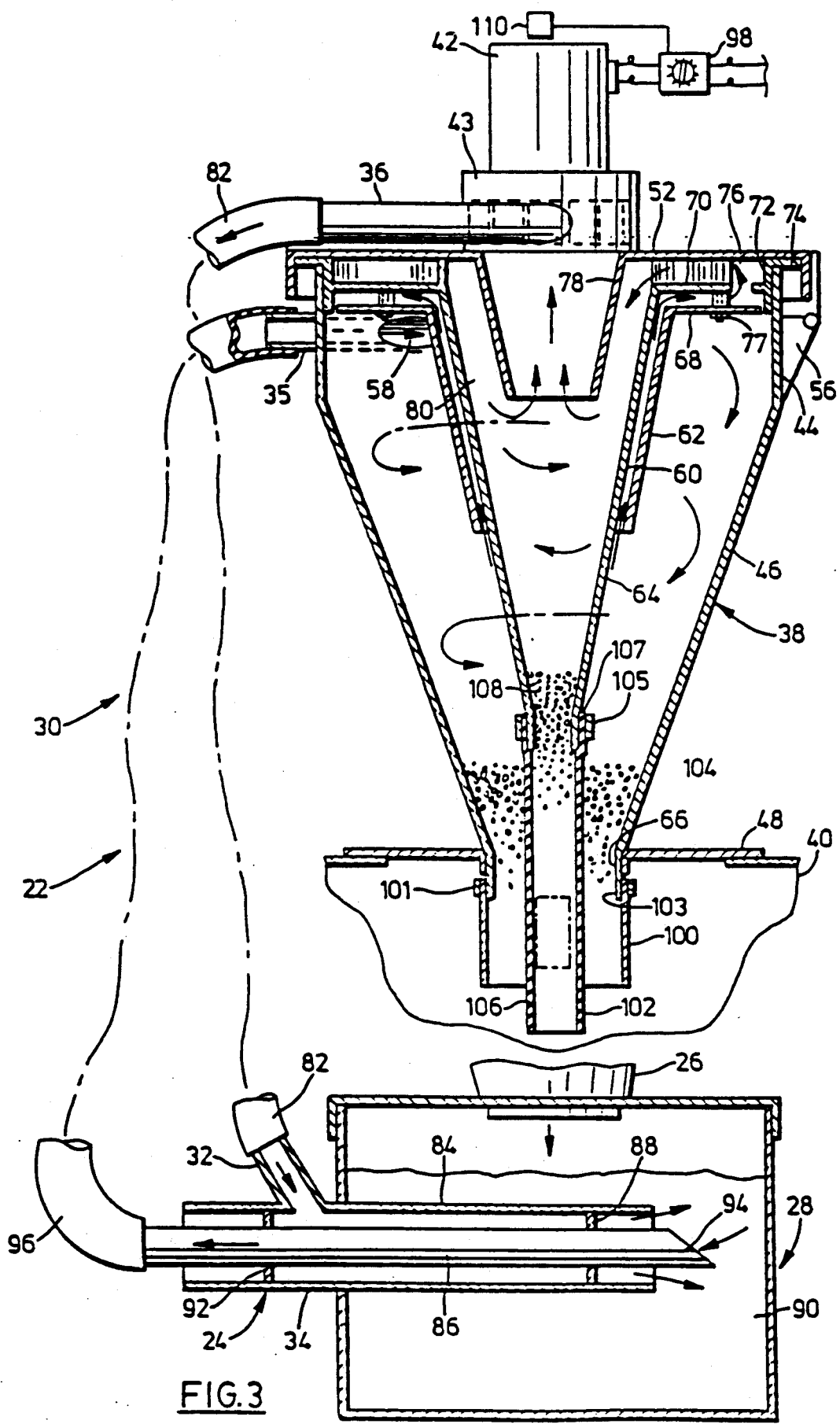
FIG. 3 is a sectional view on line 3—3 of FIG. 2 of the separator and including a sectional view of a pick-up which also forms part of the application.

Reference is made first to FIG. 1 which illustrated diagrammatically an injection moulding machine 20 to which elevating apparatus 22 is attached in accordance with an embodiment of the invention preferred in use with injection moulding machines. The apparatus 22 includes a pick-up device 24 at a first level for receiving particulate material from a supply bin 26 having an outlet attachment 28 from which the pick-up device receives particulate material as will be described in more detail with reference to FIG. 3. The material in the bin 26 may be dry but quite often this bin is coupled to a drier to drive moisture from the material. The pick-up device 24 has a duplex connection 30 running between an inlet 32 of the pick-up device and an outlet 34 and, above the injection moulding machine 20, an inlet 35 and an outlet 36 of a separator 38. This separator sits above a bin 40 mounted on the injection moulding machine 20 to receive batches of material from the separator 38 as will be described. As can be seen in FIG. 1 air is entrained in a loop to move between a lower first level at pick-up device 24 and the separator 38 which is above a second level defined by the top of the bin 40. A motor 42 and associated fan is mounted on the separator 38 for inspiring air movement in the loop.

In situations where the material in the supply bin 26 is dry, then the air loop will entrain air from this bin and supply it in batches to the bin 40 where it will retain its low moisture content. In situations where the moisture content is too high, both bins or one of the bins can be coupled to a drier as preferred. For instance, the bin 40 is of sufficient volume that it can be coupled to a drying apparatus (not shown) and maintained at a suitable dryness for use in the machine. It is to be understood that any excess moisture in the material is the result of moisture being contained in the supply bin 26 and is not induced from air used to elevate the particulate material to the bin 40. Consequently, the energy required to dry the material is the same as that which would have been required to treat the bin 26 as received from the supplier. There is no further energy loss caused by moisture transfer from the air used to elevate the material.

Although the movement of the particulate material may cause breakdown of the particles due to their impact with one another as they move to the separator 38, small particles and dust originate mainly from recycled materials which can be mixed with new material. The actual constituents of the particles will vary depending upon the injection moulding material being used and some will separate more readily than others. Recycled materials can be very powdery in form and can include particles of glass fibre, or other materials used in the injection moulding process. The fine particles or pulverulents must be separated in such a way that they cannot agglomerate and end up falling into the mix as enlarged particles of one of the components of the material. Such particles could find their way into the mix and show up in the end product making the product unacceptable.

The apparatus will normally ensure that all of the material is fed into the injection moulding machine regardless of separation of pulverulents from the particulates but can be used to separate the small pulverulents as will be described. An important aspect of the invention is that pulverulents are removed from the air at the separator and not allowed to be transported continuously around the loop where they could agglomerate and form independent particles which would affect the quality of the finished moulding.

Reference is next made to FIG. 2 which illustrates the separator 38 to a larger scale. It will be seen that the inlet 35 is tangential to a cylindrical portion 44 at the top of an outer funnel 46 which has a frustro-conical lower portion terminating at a mounting flange 48 by which it is attached to the top of the bin 40. Air entering the inlet 35 is inspired by the motor 42 and associated fan 43 which pumps air through outlet 36 in the loop. As will be described, the motor and fan are mounted on a lid 52 held in place by a latch 54 which, when released, permits the lid to be hinged upwardly about a hinge 56 shown in FIG. 3.

Reference is next made to FIGS. 3, 4 and 5 which illustrate the internal details of the separator 38. These details will be described with reference to air entering the separator through inlet 35 and leaving through outlet 36. The air initially enters via a tangential port 58 causing it to move around the cylindrical portion 44 in a swirling action and then, due to pressure differentials, the air moves around and down in an annular path contained by the frustro-conical outer funnel 46 until the path is suddenly changed to flow upwardly through an annular, passage 60 formed between an outer sleeve 62 and an inner funnel 64. This upward movement of the air which will continue to have a swirling action and its sudden transition from downward extending annular air path to upwardly extending annular air path will result in the majority of the particulates falling from the air in a primary separation and resting at the bottom of the frustro-conical funnel 46 adjacent an exit 66. Particulates will build up while air is circulated and will then be released as a batch as will be described.

Continuing with the movement of the air, after passing upwardly through the passage 60, the air moves radially outwards between a radial flange 68 at the top of the sleeve 62 and a similar flange 70 formed at the top of the funnel 64. The flange 70 terminates at its outward extremity at a rim 72 which fits snugly within the cylindrical portion 44 and which, at its upper extremity, has a radial lip 74 which rests on the upper end of the portion 44 to locate on this portion. As will be described, air moving radially outwardly between the flanges 68 and 70 is entrained to flow through an opening 76 formed in the flange 70 and thence into a radial passage between the flange 70 and the lid 52 of the separator. This lid has a central opening from which depends downwardly a conical inner sleeve 78 terminating above the bottom extremity of the conical sleeve 62 and also extending in parallel with the inner funnel 64. The air is therefore entrained to move in a second downwardly extending annular air path defined by a passage 80 and then to change direction suddenly to enter the bottom extremity of the inner sleeve 78 and thence via a second upwardly extending annular air path to the fan 43 where the air is made to move through the outlet 36. A secondary separation takes place at this location. The radial flange 70 has three studs 71 (FIG. 5) attached for engagement through corresponding openings 73 (FIG. 4) spaced equally on a pitch circle diameter concentric with the radial flange 68. Spacers 75 set the depth of passage between the flanges 68 and 70 and three nuts 77 (FIG. 3) are provided for the studs.

Continuing with the air movement, air from outlet 36 of the separator 38 passes through a duct 82 (FIG. 3) forming part of the duplex connection 30 which leads to the inlet 32 of the pick-up device 24. The air enters a larger tube 84 and is allowed to pass through this tube about a smaller and concentric inner tube 86 which passes through a spider support 88 and projects to engage the particulate material 90 contained in the outlet attachment 28. Inner tube 86 is supported within the outer tube 84 both by spider 88 and by an annular fitting 92 which is attached to the outer tube and which is a friction fit about the inner tube 86. As a result the inner rube 86 can be adjusted to position an angled end 94 with reference to the end of the outer tube 84. This affects the flow pattern of the air as it entrains material between leaving the outer tube 84 and returning via the inner tube 86. It will be found that by varying the position of the inner tube, the fluidization of the particulate material will be optimized for better flow into the inner tube and hence through the system to the separator 38.

The inner tube 86 is attached at its outer extremity to the lower end of a duct 96 which also forms part of the duplex connection 30 and is attached at its upper extremity to the inlet 35 of the separator 38.

The movement of air continues as long as the motor 42 is energized. Power is supplied to the motor via a timer 98 which can be set for particular consecutive periods of activation and rest. As soon as the timer disconnects the motor from power, the air movement will stop in the loop and then there is equalization of pressure throughout the system. Prior to this the pressure inside the separator 38 is maintained at less than atmospheric due to the pressure drop created by the flow of air through the remainder of the loop, and in particular in fluidizing the particulate material within the outlet attachment 28.

The negative pressure in the separator retains first and second closures 100, 102 in a closed condition because of the pressure differential between outside and inside these closures. Closure 100 is attached by a hose clamp 101 to a cylindrical extension 103 at the lower end of the frustro-conical outer funnel 46 and closure 102 is attached by a smaller hose clamp 105 to another cylindrical portion 107 at the bottom end of the funnel 64. Their flexibility is essential to this operation and as soon as the pressure is equalized, the weight of the particulate material 104 retained by closure 100 will open this closure and allow the particulate material from the primary separation to trickle down into the bin 40 displacing dry air from the bin into the separator. Similarly, a very flexible tube is used for the closure 102 which in use is nipped by the closure 100 to ensure that it is closed to hold back material from the secondary separation. Closure 102 is so flexible that it has to be retained in position to prevent it being sucked back into the separator and to this effect, a VELCRO (registered trade mark) connection 106 is made between the closures 100 and 102. Consequently, when the weight of the particulate material 104 causes the closure 100 to open, it allows the closure 102 to open also and the lighter material 108 which will be essentially pulverulent will fall through the closure 102 and also go into the bin 40.

The closure 102 could be arranged to lead the material collected at the second separation to a container separate from the bin 40 if preferred and as indicated at 109 in FIG. 1 by extending the tubular closure 102 down and out of the side of the bin 40. The timer 98 permits this cycle to take place and then will commence the air movement again to elevate more material into the bin 40.

Clearly the flow of material must be related to the need for material from the injection moulding machine and to this end, a sensor indicated diagrammatically by the numeral 110 (top of FIG. 3) and activated by the level of material in bin 40 is coupled to the control timer 98 to isolate the timer should there be no need for material in the bin 40.

More details of the closures 100 and 102 can be seen in the sectional view shown as FIG. 6. Closure 100 is shaped to define a mouth which is normally closed but which is responsive to small inside loading to cause it to open sufficient for particulates to fall out. The closure 102 is simply a very flexible tube held closed by the closure 100 under the influence of pressure differentials as already explained. The VELCRO connector prevents the closure 102 being sucked upwardly when the apparatus is started and the initial negative pressure is first applied to this closure.

The embodiment described makes it possible for recycled materials to form a significant percentage of the material fed to machines, requiring particulate or granular material which is then melted and fed to the machine. If the recycled material has an acceptable small fines content, this can be discarded via the outlet 109 (FIG. 1).

Figure 7:
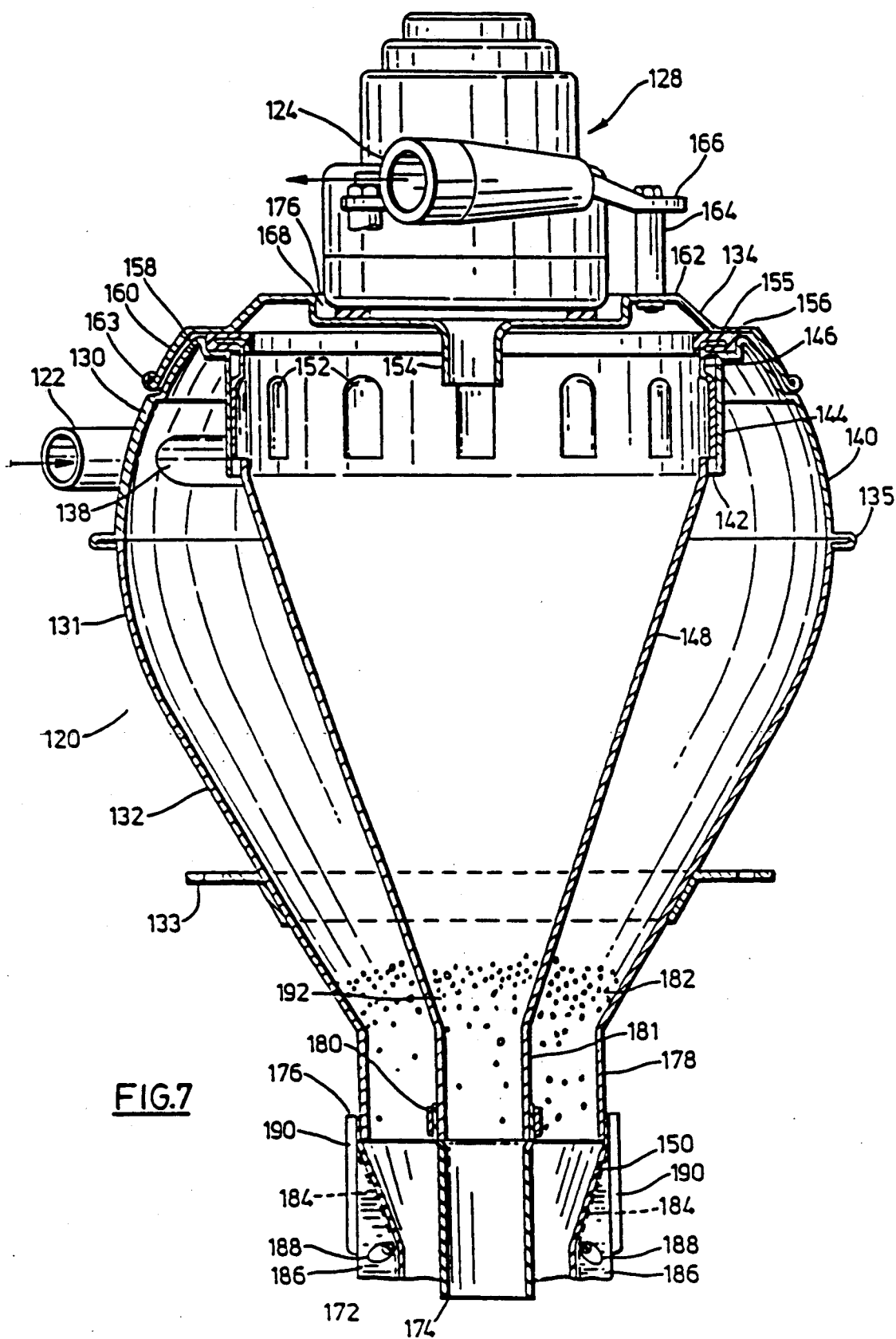
FIG. 7 is a sectional side view of a second example of a separator for use with apparatus according to an embodiment of a type for use with an injection moulding machine.
Figure 8:
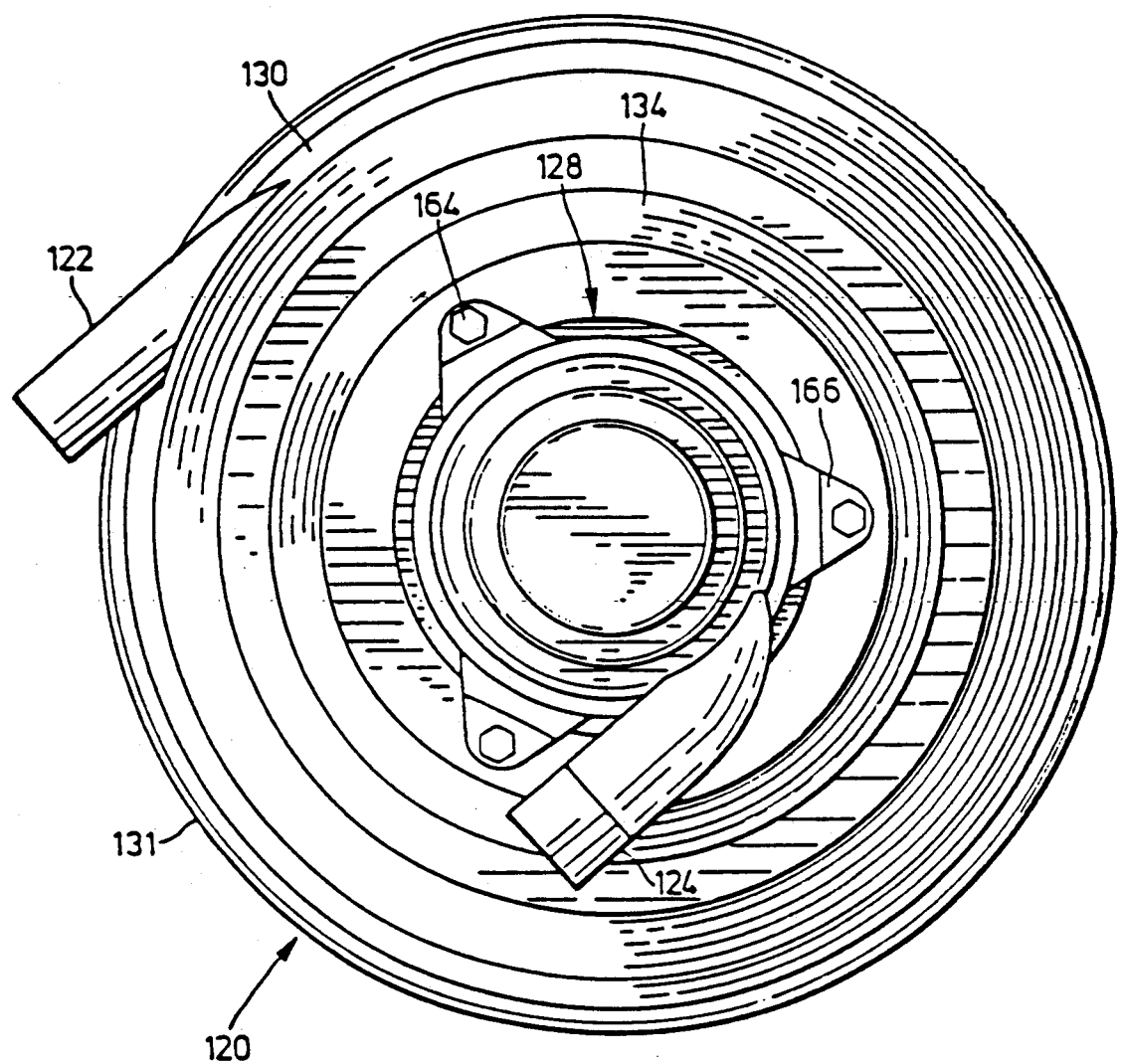
FIG. 8 is a plan view of the separator of FIG. 7.

FIGS. 7 and 8 illustrate a second embodiment of separator 120, suitable for use with elevating apparatus 22 as described above. As with the separator described previously the separator 120 forms part of a loop and is coupled to a pick up device through an inlet 122 and an outlet 124. The separator is mounted above a bin mounted on an injection moulding machine (not shown) to receive batches of material from the separator 120. A motor and associated fan 128 are mounted on the separator 120 for inspiring air movement in the loop. It will be seen best in FIG. 8 that the inlet 122 is tangential to an upper portion of 130 of the top of an outer funnel 131 which is rounded outwardly in the form of an inverted pear shape and is supported, around a lower portion 132, by a mounting flange 133 by which it is attached to the top of the bin. The upper and lower portions of the funnel 131 are joined by means of a annular rolled over seam 135.

Air entering the inlet 122 is inspired by the fan 128 which pumps air through outlet 124 into the loop. As will be described, the motor and fan 128 are mounted on a lid 134 attached by a hinge or other mechanism to the outer funnel 131.

The internal details of the separator will be described with reference to particles carried in air entering the separator through inlet 122 and leaving through outlet 124. The air initially enters via a tangential port 138 causing it to move around the upper portion 130 of the outer funnel 131 in a swirling action and then, due to pressure differentials, the air moves around and down in an annular path contained by the rounded outer funnel 131, the speed of the air decreasing as it approaches the widest part 140 of the funnel 131, below which the path is suddenly changed to flow upwardly through an annular passage 142 formed between an annular outer sleeves 144, 146. The sleeve 146 forms a generally cylindrical part of an otherwise frustro-conical inner funnel 148. The upward movement of the air, which will continue to have a swirling action, and its sudden transition from downward extending annular air path to upwardly extending annular air path, combined with the drop in speed of the air and the lengthened flow path caused by the swirl, will result in the majority of the particles falling from the air in a primary separation and resting at the bottom of the inverted pear-shaped funnel 131 adjacent an exit 150. Particles will build up above the exit 150 while air is circulating and will then be released periodically in a batch as will be described. Continuing with the movement of the air, after passing upwardly through the passage 142 the air is drawn through louvres 152 lanced and deformed to appear in the passage 142. The louvres 152 are shaped to continue the swirling action of the air in the interior of the funnel 148. On entering the funnel 148 the air tends to circulate around and down the funnel 148, before being drawn upwardly through a centrally mounted fan inlet 154 which depends from the lid 134 and leads, through the fan 128, to the outlet 124.

The frustro-conical funnel 148 is supported at its top within the outer funnel 131 by an annular flange 155 which extends radially from the upper edge of the sleeve 146 and rests, on a resilient mounting 156, located on a ledge 158 formed at the upper end of the outer funnel 131. The mounting 156 wraps around the flange to cover the upper face of the flange 155 and thereby form a sealing support for the lid 134. The lid itself is generally circular in plan view and has an outer rolled edge skirt 160 that extends a short distance from the mounting 156 down and around a recessed portion 163 of the funnel 131. The central portion of the lid 134 features a raised parts 162, each of which receives one of three mounting studs 164 (one of which is seen) that extend from flanges 166 on the motor casing to position the motor in a central dished portion 168. The fan inlet 154 depends from the dished portion 168 which is provided with an annular seal 176 for supporting the motor and fan 128. Air from the fan outlet 124 passes through a duct to the inlet of a pick-up device as described with reference to the first embodiment.

As with the first embodiment, the separator 120 has flexible closures 172 and 174 which are retained in a closed condition because of the pressure differential between the inside and outside of the closures. Closure 172 is attached to a cylindrical extension 178 at the outer funnel 131 by a spring clamp 176 which grips the closure and extends downwardly as will be explained. The inner closure 174 is attached by a smaller spring clamp 180 to another cylindrical portion 181 at the bottom end of the inner funnel 148. The flexibility of the closures 172 and 174 is essential to the operation so that when the motor 128 is switched off and the pressure equalized, the weight of particulate material 182 retained by closure 172 will open this closure and allow the particulate material from the primary separation to trickle down into the bin displacing dry air from the bin into the separator 120. Similarly, a very flexible tube is used for the closure 174 and this operates in a similar manner.

The outer closure 172 is formed of a cylindrical piece of material which has seams 184 sewn at diametrically opposed portions to provide two areas of double thickness 186. Each area 186 is provided with an eyelet 188 to receive an end of an extension 190 which extends downwardly from the spring clamp 176 on the cylindrical extension 178. The arrangement is such that when the closure 172 collapes laterally between the seams 184, it is located by the extensions 190 riding in the eyelets 188.

As with the previously described separator, the closure 174 may be arranged to lead the material 192 collected at the second separation to a container separate from the bin. Also, the separator 120 may be provided with a timer or sensor to control the activation of the motor.

It will now be clear that the embodiments described for use with injection moulding machines are exemplaryof other embodiments for use in different situations. The typical particulate material is exemplary of materials such as grain, powders, etc. These and other variations are within the scope of the invention as claimed.

I claim:

1. Apparatus for elevating particulate material from the level to a higher second level and comprising:
   pick-up means for insertion into the material at the lower level and having an outlet and an inlet;
   a separator for removing the particulate material from an air stream;
   duplex duct means coupling the separator and the pick-up means to form a loop;
   actuator means operable to drive air around the loop so that air leaving the pick-up means outlet entrains the particulate material and then carries the material through the inlet and via the duct means to the separator where the material is substantially stripped from the air before the are returns via the duct means to the pick-up means;
   the separator comprising, concentric inner and outer funnels arranged about a vertical axis and defining an axially extending annular space, inlet means attached to the outer funnel and positioned to cause inflowing air to move between the funnels in an annular flow path, the annular space having an increasing cross-sectional area adjacent the inlet means and in that downward axial direction of the annular space so that particulate material carried by air in the flow path will tend to fly outwardly onto the outer funnel and fall axially, outlet means collecting air from the flow path and exhausting the air from the separator, and collection means coupled to the outer funnel for receiving falling particulate material and operable to withdraw such material periodically from the separator, the separator being located above the second level and the collection means including bottom exit means and resilient closure means coupled to the bottom exit means, the closure means being responsive to negative pressure in the separator to retain the closure means in a closed position; and
   control means including a timer operable in discrete time periods to energize the actuator means to drive the air around the loop and, upon completing one of said time periods, to provide time for the material in the collection means to fall under the force of gravity through the bottom exit means.

2. Apparatus as claimed in claim 1 in which the pick-up means comprises inner and outer tubes, the inlet feeding air between the tubes to exit into the material and the inner tube receiving air and material and conducting the air and material to the outlet.

3. Apparatus as claimed in claim 2 in which the inner and outer tubes are adjustable longitudinally with reference to one another.

4. Apparatus as claimed in claim 1 in which said annular flow path defines a first downwardly extending annular air path followed by a first upwardly extending annular air path to cause primary separation of the particulate material from the air as the air makes a transition from the downwardly extending to the upwardly extending air path.

5. Apparatus as claimed in claim 4 in which the annular flow path further includes a second downwardly extending annular air path following the first upwardly extending air path, and a second upwardly extending annular air path following the second downwardly extending annular air path for secondary separation of the particulate material from the air.

6. Apparatus as claimed in claim 5 and in which the closure means includes a first closure receiving material from the primary separation and a second closure receiving material from the secondary separation.

7. Apparatus as claimed in claim 6 in which the secondary closure projects through the primary closure.

8. Apparatus for use with injection moulding machines to move particulate material from the lower bin to an upper bin, the material having a controlled humidity and the upper bin being coupled to the moulding machine for gravity feeding the material in response to a demand for material at the machine, the apparatus comprising:
   a pick-up engagement in the material contained in the lower bin;

a separator for attachment to the upper bin for batch delivery of material into the upper bin;

duplex ducting connecting the separator and the pick-up to form an air loop;

actuator means in the air loop and operable to drive air around the loop so that material collected at the pick-up is deposited in the separator;

the separator comprising, concentric inner and outer funnels arranged about a vertical axis and defining an axially extending annular space, inlet means attached to the outer funnel and positioned to cause inflowing air to move between the funnels in an annular flow path, the annular space having an increasing cross-sectional area adjacent the inlet means and in the downward axial direction of the annular space so that particulate material carried by air in the flow path will tend to fly outwardly onto the outer funnel and fall axially, outlet means collecting air from the flow path and exhausting the air from the separator, and collection means coupled to the outer funnel for receiving falling particulate material and operable to withdraw such material periodically from the separator, the separator being located above the second level and the collection means including bottom exit means and resilient closure means coupled to the bottom exit means, the closure means being responsive to negative pressure in the separator to retain the closure means in a closed position; and a timer operable to power the actuator means periodically to collect batches of material in the separator and to disconnect power from the actuator means so that the material in the separator falls into the upper bin thereby displacing air from this bin into the separator so that ambient air is not inspired into the separator by the movement of material into the upper bin.

9. Apparatus as claimed in claim 8 and further comprising limit means coupled to the separator to override the timer and disconnect power from the actuator means in the event that the level of material in the separator reaches a predetermined maximum level.

* * * * *